(12) United States Patent
Diab et al.

(10) Patent No.: US 8,817,638 B2
(45) Date of Patent: Aug. 26, 2014

(54) METHOD AND SYSTEM FOR NETWORK COMMUNICATIONS UTILIZING SHARED SCALABLE RESOURCES

(75) Inventors: Wael William Diab, San Francisco, CA (US); Bruce Currivan, Dove Canyon, CA (US); Jayhan Karaoguz, Irvine, CA (US); Yongbum Kim, San Jose, CA (US); Kenneth Ma, Cupertino, CA (US); Michael Johas Teener, Santa Cruz, CA (US)

(73) Assignee: Broadcom Corporation, Irvine, CA (US)

( * ) Notice: Subject to any disclaimer, the term of this patent is extended or adjusted under 35 U.S.C. 154(b) by 679 days.

(21) Appl. No.: 12/616,603

(22) Filed: Nov. 11, 2009

(65) Prior Publication Data

US 2011/0019530 A1 Jan. 27, 2011

Related U.S. Application Data

(60) Provisional application No. 61/228,371, filed on Jul. 24, 2009.

(51) Int. Cl.
*H04L 12/26* (2006.01)
*H04L 12/56* (2006.01)

(52) U.S. Cl.
CPC .................................. *H04L 45/306* (2013.01)
USPC ........................................................ 370/252

(58) Field of Classification Search
USPC .................................. 370/229–258, 351–389
See application file for complete search history.

(56) References Cited

U.S. PATENT DOCUMENTS

| | | | |
|---|---|---|---|
| 7,613,143 B2* | 11/2009 | Kakishima et al. | 370/328 |
| 2002/0165957 A1* | 11/2002 | Devoe et al. | 709/224 |
| 2003/0177219 A1* | 9/2003 | Taib et al. | 709/223 |
| 2004/0018839 A1* | 1/2004 | Andric et al. | 455/433 |
| 2004/0202158 A1* | 10/2004 | Takeno et al. | 370/389 |

(Continued)

FOREIGN PATENT DOCUMENTS

| | | |
|---|---|---|
| EP | 1294144 A2 | 3/2003 |
| EP | 1443721 A2 | 8/2004 |

OTHER PUBLICATIONS

European Search Report for European Patent Application No. 10007332.9-2413, mailed Jun. 24, 2011.

(Continued)

*Primary Examiner* — Obaidul Huq
*Assistant Examiner* — Juvena Loo
(74) *Attorney, Agent, or Firm* — Brinks Gilson & Lione

(57) ABSTRACT

Aspects of a method and system for network communications utilizing shared scalable resources are provided. In this regard, networking state information for one or more of a plurality of communication devices may be communicated to a network management device. The network management device may be operable to aggregate the networking state information. The plurality of communication devices may receive aggregated networking state information from the network management device. The plurality of communication devices may route packets based on the received aggregated networking state information. The network management device may be dynamically or manually selected from the plurality of communication devices. The plurality of communication devices may be associated with a sharing domain, and one or more communication devices may be dynamically added to and/or removed from the sharing domain.

20 Claims, 6 Drawing Sheets

(56) References Cited

U.S. PATENT DOCUMENTS

2005/0220123 A1* 10/2005 Wybenga et al. ............. 370/400
2005/0281271 A1 12/2005 Beshai et al.
2007/0008949 A1* 1/2007 Balandin ....................... 370/351
2007/0073733 A1* 3/2007 Matthews et al. ............... 707/10
2007/0242607 A1* 10/2007 Sadler et al. .................. 370/238
2009/0097397 A1* 4/2009 Moreira Sa de Souza .... 370/216

OTHER PUBLICATIONS

Office Actions issued in Chinese patent application No. 201010232785.7 dated Dec. 25, 2012 and Sep. 10, 2013 (11 pages).

* cited by examiner

METHOD AND SYSTEM FOR NETWORK COMMUNICATIONS UTILIZING SHARED SCALABLE RESOURCES

CROSS-REFERENCE TO RELATED APPLICATIONS/INCORPORATION BY REFERENCE

This patent application makes reference to, claims priority to and claims benefit from U.S. Provisional Patent Application Ser. No. 61/228,371 filed on Jul. 24, 2009.

The above stated application is hereby incorporated herein by reference in its entirety.

FIELD OF THE INVENTION

Certain embodiments of the invention relate to networking. More specifically, certain embodiments of the invention relate to a method and system for network communications utilizing shared scalable resources.

BACKGROUND OF THE INVENTION

An electronic communication network is a collection of two or more computing nodes, which are communicatively coupled via a transmission medium and utilized for transmitting information. Most networks adhere to the layered approach provided by the open systems interconnect (OSI) reference model. The OSI reference provides a seven (7) layer approach, which includes an application layer, (Layer 7), a presentation layer (layer 6), a session layer (Layer 5), a transport layer (Layer 4), a network layer (Layer 3), a data link layer (Layer 2) and a physical layer (Layer 1). Layer 7 through layer 5 inclusive may comprise upper layer protocols, while layer 4 through layer 1 may comprise lower layer protocols. Some networks may utilize only a subset of 7 layers. For example, the TCP/IP model, or Internet Reference model generally utilizes a five layer model, which comprises an application layer, (Layer 7), a transport layer (Layer 4), a network layer (Layer 3), a data link layer (Layer 2) and a physical layer (Layer 1). These five layers can be broken down into a fairly specific set of responsibilities or services, which they provide.

As electronic communication networks become increasingly popular, ways of exchanging data of various types, sizes for a variety of applications and business and consumers alike want network access on more and more devices. Moreover, consumers and business continually want faster network access and/or greater bandwidth on all of their communication devices. Consequently, communicating the increased amounts of data between an increasing number of devices presents many challenges to network and system designers and administrators.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for network communications utilizing shared scalable resources, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for network communications utilizing shared scalable resources. In various embodiments of the invention, networking state information for one or more of a plurality of communication devices may be communicated to a network management device. The network management device may be operable to aggregate networking state information based on the received networking state information. The plurality of communication devices may receive the aggregate networking state information from the network management device. The plurality of communication devices may route packets based on the received aggregated networking state information. The network management device may be dynamically selected from the plurality of communication devices. The network management device may be selected by a network administrator, for example. Updates and/or changes to the networking state information may be communicated to the network management device. The plurality of communication devices may be associated with a sharing domain and one or more communication devices may be dynamically added to and/or removed from the sharing domain.

The aggregate networking state information may also be periodically or aperiodically communicated from the network management device to a backup network management device. The networking state information may be communicated to a backup network management device upon detecting a failure of the network management device. After a failure of the network management device, the plurality of communication devices may begin receiving aggregated networking state information from the backup management device. The networking state information may comprise, for example, one or more parameter values associated with one or more applications running on the one or more of a plurality of communication devices. The networking state information may comprise, for example, one or more parameter values associated with one or more datastreams being communicated by one or more of the plurality of communication devices.

Figure 1:
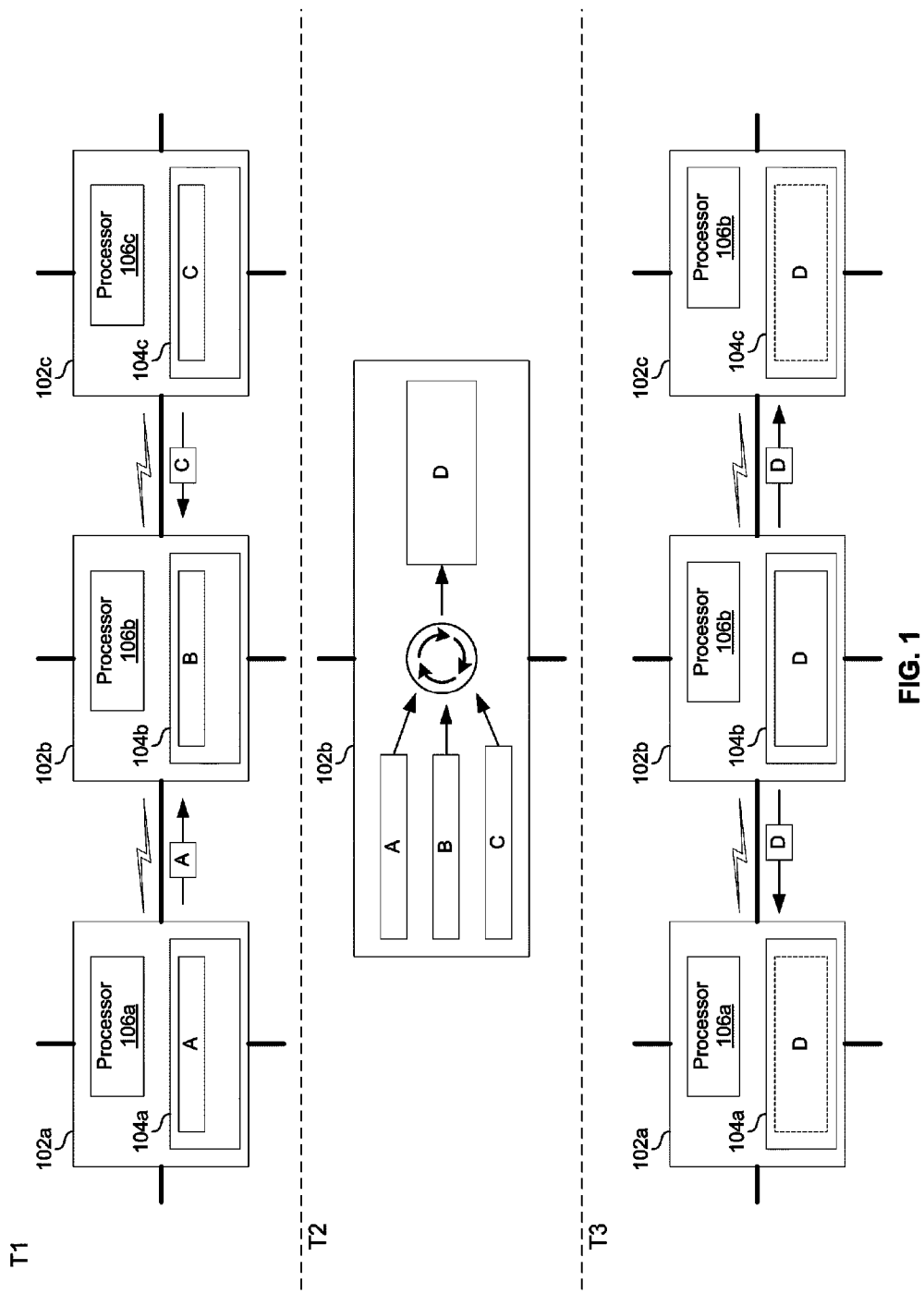
FIG. 1 is a diagram illustrating exemplary sharing of network state information among communication devices, in accordance with an embodiment of the invention.

FIG. 1 is a diagram illustrating exemplary sharing of network state information among communication devices, in accordance with an embodiment of the invention. Referring to FIG. 1, there is shown communication devices 102a 102b, and 102c, which are referenced collectively and individually as communication device(s) 102. The communication devices 102a, 102b, and 102c may, respectively comprise memories 104a, 104b, and 104c, which are referenced collectively and individually as memory 104.

The communication devices 102a, 102b, and 102c may each comprise suitable logic, circuitry, interfaces, and/or code that may be operable to transmit and receive data in adherence with one or more networking standards. The communication devices 102a, 102b, and 102c may be communicatively coupled via, for example, a T1/E1 line, a passive optical network, DSL, a cable television infrastructure, a satellite broadband internet connection, a satellite television infrastructure, a cellular network, Bluetooth, wireless Ethernet, WiMAX, and/or wired Ethernet. The communication devices 102a, 102b, and 102c may each be operable to implement, switching, routing, and/or network adaptor functions. In this regard, the communication devices 102a, 102b, and 102c may each be operable to implement physical layer functions, data link layer functions, and may implement functions associated with OSI layer 3 and/or higher OSI layers.

The communication device 102 may each comprise a processor 106. The processors 106 may each comprise suitable logic, circuitry, interfaces, and/or code that may be operable to process data and/or control operations of the corresponding communication device 102. With regard to processing data, the processor 106 may be operable to packetize, de-packetize, transcode, reformat, and/or otherwise process data received from and/or to be transmitted by the corresponding communication device 102. With regard to controlling operations of the corresponding communication device 102, each processor 106 may be operable to provide control signals to the various other portions of the corresponding communication device 102. Each processor 106 may also be operable to control data transfers between various portions of the corresponding communication device 102. The processor 106 may be operable to execute applications programs and/or code. In this regard, the applications, programs, and/or code may enable, for example, generating, parsing, transcoding, or otherwise processing data. Furthermore, the applications, programs, and/or code may enable, for example, configuring or controlling operation of the corresponding communication device 102. In various embodiments of the invention, one or more networking rules may guide operations and/or functions performed by the processor 106. Such policies and/or rules may be part of an access control list (ACL), for example.

The communication device 102a comprises memory 104a. For illustrative purposes, networking state information that is stored in the memory 104a is referenced as 'A.' The communication device 102b comprises memory 104b. For illustrative purposes, the networking state information that is stored in the memory 104b is referenced as 'B.' The communication device 102c comprises memory 104c. For illustrative purposes, the networking state information that is stored in the memory 104c is referenced as 'C.' Each of the communication devices 102 may be operable to utilize networking state information stored in its respective memory 104 for determining how and/or when to process data and/or how, when, and/or where to transmit data. In this regard, networking state information 'A', 'B', and 'C' stored in the memories 104a, 104b, 104c, respectively, may comprise a routing table that may enable determining which port to utilize for transmitting data. Additionally, the information 'A', 'B', and 'C' may each comprise values of one or more parameters, and/or rules which may be utilized for communicating and/or processing data.

The parameter values may, for example, indicate applications running on a communication device 102, number and/or types of datastreams being generated by one or more applications running on a communication device 102, protocols utilized in generating and/or packetizing a datastream, and/or a quality of service required by one or more datastreams. Accordingly, the parameter values may be utilized to determine how to service or handle packets associated with the datastreams. For example, the parameter values may be utilized to determine processing cycles to allocate for processing packets of a datastream, memory to allocate for buffering packets of a datastream, which queue(s) to utilizing for buffering packets of a datastream, how long the packets of a datastream may be buffered, which link to forward packets of a datastream onto, determining a data rate at which to communicate packets of a datastream, and determining whether and/or when the communication device 102a, 102b, and/or 102c may operate in an energy saving mode. Additionally or alternatively, the parameter values may provide an indication to communication devices receiving the packets, such as the communication devices 102 and other communication devices not shown in FIG. 1, as to how to prioritize and/or otherwise handle or service packets.

The rules may control, for example, types of data that may be communicated via one or more ports, the amount of data that may be communicated via one or more ports, which information may be accessed via which devices, and which information may be accessed via which ports. Also, the rules may, for example, security and/or authentication configuration. In this regard, the rules may enable access control to various information and/or network resources.

In operation, during time interval T1, each of the communication devices 102 may be operable to determine and/or generate its respective networking state information. In this regard, memory 104a may be populated with the networking state information 'A' which may comprise, for example, a routing table utilized by the communication device 102a and/or one or more parameter values and/or rules utilized for processing and/or tagging packets. Similarly, the memory 104b may be populated with the information B' which may comprise, for example, a routing table utilized by the communication device 102b and/or one or more parameter values and/or rules utilized for processing and/or tagging packets. Also, the memory 104c may be populated with the information 'C' which may comprise, for example, a routing table utilized by the communication device 102c and/or one or more parameter values and/or rules utilized for processing and/or tagging packets.

After the networking state information 'A', 'B', and 'C' is generated, the communication devices 102a and 102c may be operable to communicate networking state information 'A' and 'C', respectively, to the communication device 102b. In this regard, the communication device 102b may have been selected as the management or "master" device via any of a variety of methods. For example, the management device may have been selected randomly, selected based on location, selected based on traffic patterns in the network, or selected based on it being a dedicated and/or default management device. In various embodiments of the invention, the management device may be selected automatically or may be selected manually by a network administrator. Additionally, the communication device that operates as the management device may change over time. In various embodiments of the invention, the frequency of with which networking state information is sent to the management device may be determined based on, for example, rules in place in the communication devices, parameter values in the communication devices, and/or applications running on the communication devices.

The networking state information 'A' and 'C' may be communicated utilizing a dedicated protocol, utilizing an existing management protocol such as SNMP, or may be communicated utilizing other existing protocols such as Ethernet. For example, the networking state information 'A' and 'C' may each be encapsulated as a payload of a corresponding Ethernet frame and the Ethernet frames may comprise a distinct Ethertype that indicates that the frames comprise networking state information to be utilized by a management device for generating aggregate networking state information. Additionally, the networking state information 'A' and 'C' may be communicated securely utilizing protocols such as MACsec and/or IPsec. In this regard, various security rules in place in the networking devices may factor into how and/or when the networking state information is shared.

During time interval T2, after receiving the networking state information 'A' and 'C', the communication device 102b may be operable to generate aggregate networking state information 'D'. In this regard, the aggregate networking state information 'D' may comprise some or all of networking state information 'A', 'B', and/or 'C'. In various embodiments of the invention, redundant networking state information in one or more of 'A', 'B', and 'C' may be removed from the aggregate networking state information 'D'.

During time interval T3, the aggregated networking state information 'D' may be communicated from the communication device 102b to the communication devices 102a and 102c. The aggregate networking state information 'D' may be communicated utilizing a specialized protocol, utilizing an existing management protocol such as SNMP, or may be communicated utilizing other existing protocols such as Ethernet. For example, the aggregate networking state information 'D' may be encapsulated as a payload of an Ethernet frame and the Ethernet frame may comprise a distinct Ethertype that indicates that the frame comprises aggregate networking state information. Additionally, the aggregate networking state information 'D' may be communicated securely utilizing protocols such as IPsec or MACsec. The aggregate networking state information 'D' may be appended to previously existing networking state information that is stored in the memories 104a and 104c and/or may overwrite previously existing networking state information in the memories 104a and 104c. Subsequent to updating the contents of the memories 104a, 104b, and 104c the communication devices 102a, 102b, and 102c may, respectively, be operable to route or otherwise process data utilizing the aggregate networking state information 'D' stored in the memories 104a, 104b, and 104c.

In various embodiments of the invention, after an initial sharing and aggregating of networking state information, the communication devices 102a and 102c may be operable to aperiodically and/or periodically update and/or modify the contents of the memories 104a and 104c, respectively. Accordingly, updates may aperiodically and/or periodically be communicated to the communication device 102b and updates to the aggregate networking state information 'D' may aperiodically or periodically be generated and communicated by the communication device 102b. Also, in instances that there is a backup management device, updates may occasionally or periodically be communicated to the backup management device. The frequency with which the backup management device is updated may determine how much information is lost should the management device fail or otherwise lose communication with one or both of the devices 102a and 102c.

Devices that share networking state information, such as the devices 102a, 102b, and 102c, may be part of what is referred to herein as a "sharing domain." Each sharing domain may comprise one or more communication devices selected for domain management. Also, a sharing domain may comprise one or more communication devices selected as backup management devices. In various embodiments of the invention, the devices which are part of a particular sharing domain may vary over time.

In various embodiments of the invention, the management device of a sharing domain may be operable to calculate latencies, bandwidth, and/or other metrics between various ports of devices that are part of the sharing domain. These metrics may be included in the aggregated networking state information. These metrics may be utilized, for example, in determining an optimum path for forwarding information through the sharing domain.

Figure 2A:
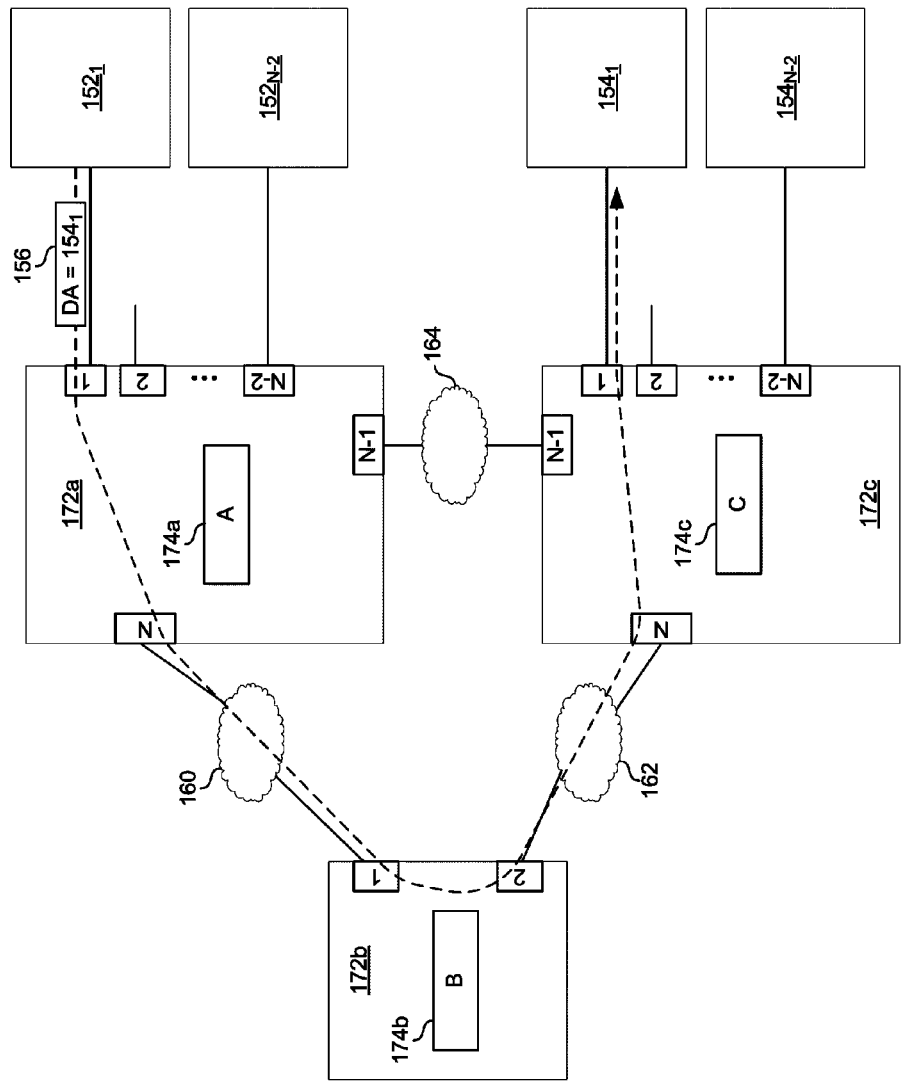
FIGS. 2A and 2B illustrate communication of data in a network in which networking state information is shared among devices, in accordance with an embodiment of the invention.
Figure 2A:
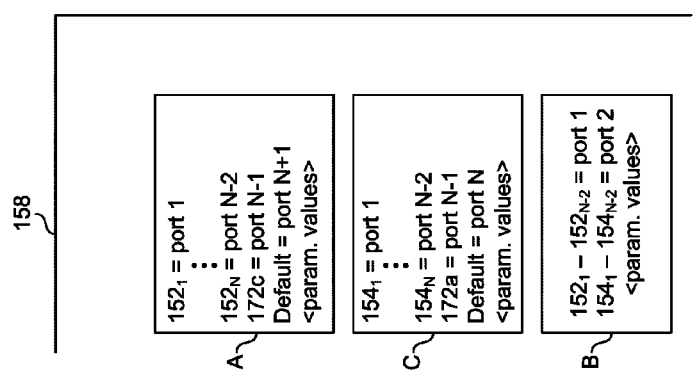
Figure 2B:
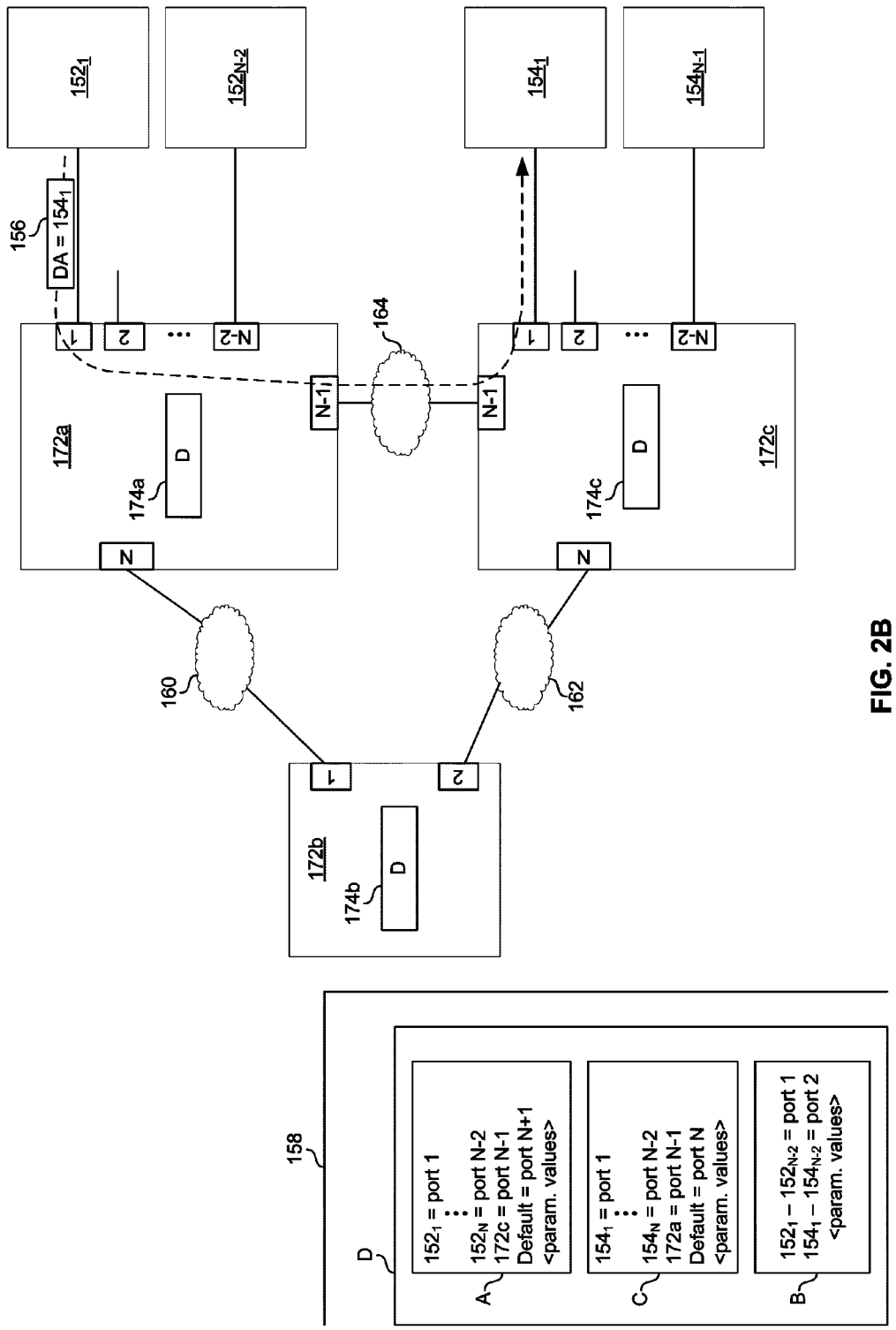

FIGS. 2A and 2B illustrate communication of data in a network in which networking state information is shared among devices, in accordance with an embodiment of the invention. Referring to FIGS. 2A and 2B, there is shown the communication devices 172a, 172b, and 172c, which may be substantially similar to the communication devices 102 described with respect to FIG. 1. The communication devices 172 may be communicatively coupled via sub-networks 160, 162, and 164. The sub-networks 160, 162, and 164 may generically represent one or more communication devices and/or links. The communication devices 172a, 172b, and 172c, may, respectively, comprise memories 174a, 174b, and 174c. Also shown in FIGS. 2A and 2B are communication devices $152_1$-$152_N$ and $154_1$-$154_N$, which may be similar to or the same as the communication devices 102, which are described with respect to FIG. 1.

Referring to FIG. 2A, an exemplary communication prior to the sharing and aggregating of networking state information is depicted. In FIG. 2A, the networking state information 'A' is stored in memory 174a, the networking state information 'B' is stored in memory 174b, and the networking state information 'A' is stored in memory 174a. Exemplary networking state information 'A', 'B', and 'C' are shown in the inset 158 in the bottom left of FIG. 2A. In this regard, the communication device $152_1$ may be operable to transmit a message 156 destined for communication device $154_1$. The message 156 may be received by the communication device 172a. The communication device 172a may refer to its networking state information 'A' to determine how to forward the message 156. However, the networking state information 'A' may not provide any guidance as to how to process and/or forward traffic to the communication device $154_1$. Accordingly, the message 156 may be sent out on the default port N of the communication device 172a.

The message 156 may then traverse one or more network links and/or other communication devices until it arrives at a communication device that knows how to forward traffic to the communication device $154_1$. In the exemplary embodiment of the invention depicted, the communication device 172b is a device that knows how to forward traffic to the communication device $154_1$. The communication device 172b may, based on the networking state information 'B', forward the message 156 to the device 172c. The communication device 172c may, based on the networking state information 'C', forward the message 156 to the communication device $154_1$. Thus, data communicated in the conventional method depicted in FIG. 2B may result in traffic traversing more hops than necessary.

In various embodiments of the invention, sharing of policies or rules—stored in one or more access control lists [ACLs], for example—may enable more efficient and/or intelligent routing, switching, bridging, and/or processing of packets. For example, the network node 172c may be configured with a rule that directs the network node 102c to drop any packets from any of the devices $152_1$-$152_{N-2}$. Consequently, through the sharing of the networking state information, device 172a may learn of this rule in device 172c, and device 172a may drop packets from a device $152_X$ that are destined for device 172c, rather than forwarding the packets only to have them dropped upon arriving at node 172c.

Referring to FIG. 2B, the exemplary communication in FIG. 2B depicts and example of how sharing networking state information and/or other parameters may result in more efficient routing, switching, bridging, or otherwise processing traffic. In FIG. 2B, the networking state information 'D' is stored in the memory 174a, 174b, and 174c. Exemplary networking state information 'D' is shown in the inset 158 in the bottom left of FIG. 2B.

In an exemplary embodiment of the invention, the communication device 172b may operate as a management device. Accordingly, the networking state information 'A' and 'C' may be communicated to communication device 172b, and the communication device 172b may generate aggregate networking state information 'D' and communicate the aggregate networking state information 'D' to the communication devices 172a and 172c. Consequently, upon receiving the message 156, the communication device 172a may utilize the aggregate networking state information 'D' to determine that the communication device $154_1$ is accessible via communication device 172c. Accordingly, the communication device may forward the message 156 via port N-1 and the communication device 172c may forward the message 156 via its port 1.

Figure 3A:
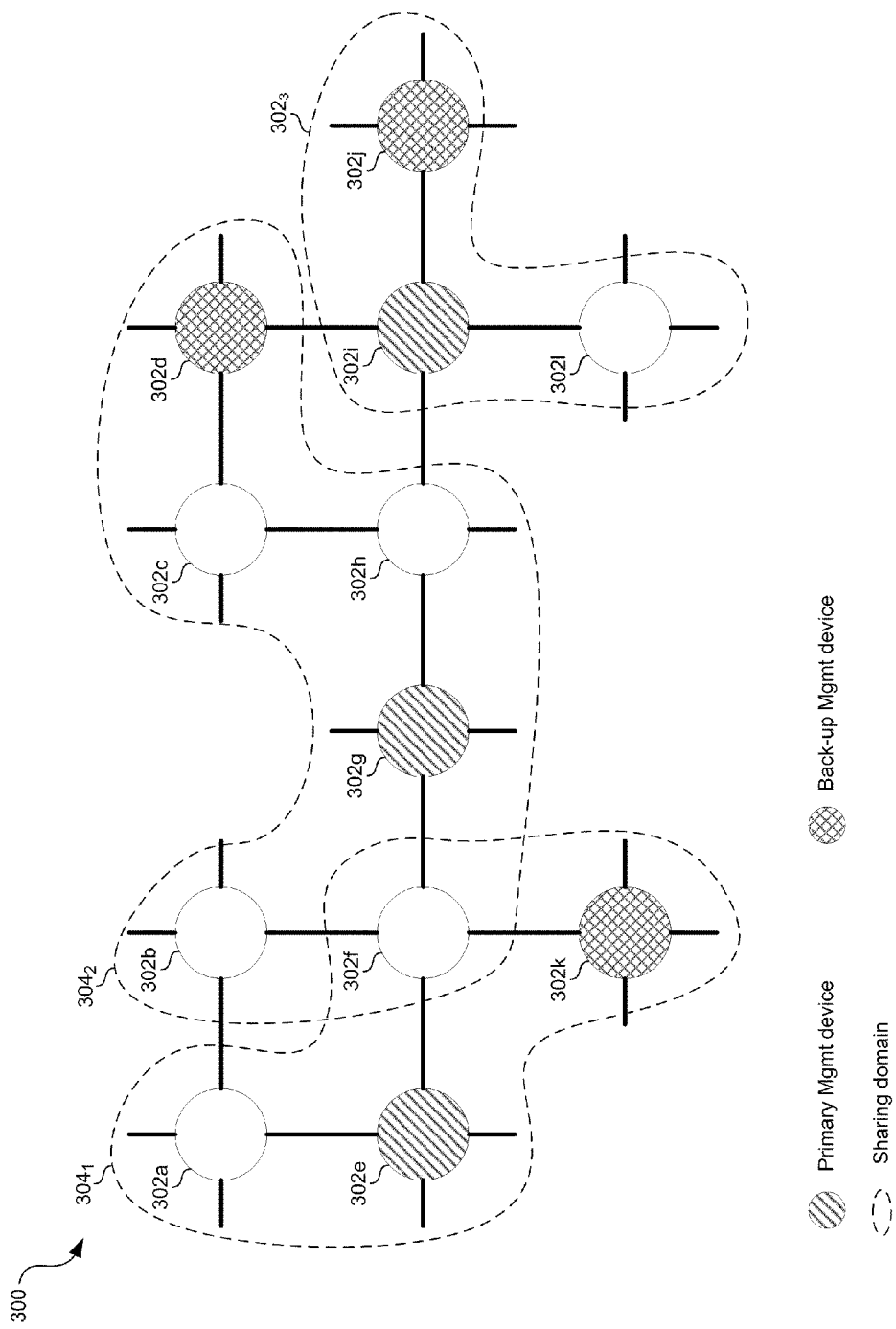
FIG. 3A depicts a network comprising a plurality of sharing domains, in accordance with an embodiment of the invention.

Although aggregation is depicted as occurring only in a single management entity, the invention is not so limited. For example, as networking state information is communicated over multiple hops to a management entity, the information may be aggregated after each hop FIG. 3A depicts a network comprising a plurality of sharing domains, in accordance with an embodiment of the invention. Referring to FIG. 3A, there is shown a portion of a network 300 comprising a plurality of communication devices 302. The communication devices 302 may be substantially similar to the communication devices 102, which are described with respect to FIG. 1.

In FIG. 3A, the communication devices 302 may be organized into sharing domains $304_1$, $304_2$, and $304_3$. The sharing domain $304_1$ may comprise the communication devices 302a, 302e, 302f, and 302k. The communication device 302e may operate as the management device of the sharing domain $304_1$ and the communication device 302k may operate as the backup management device of the sharing domain $304_1$. The sharing domain $304_2$ may comprise the communication devices 302b, 302f, 302g, 302h, 302c, and 302d. The communication device 302g may operate as the management device of the sharing domain $304_2$ and the communication device 302d may operate as the backup management device of the sharing domain $304_2$. The sharing domain $304_3$ may comprise communication devices 302i, 302j, and 302l. The communication device 302i may operate as the management device of the sharing domain $304_3$ and the communication device 302j may operate as the backup management device of the sharing domain $304_3$.

In various embodiments of the invention, one or more communication devices may be part of a plurality of sharing domains. Such communication devices may comprise a corresponding plurality of sets of aggregate networking state information. Additionally or alternatively, having a communication device as part of multiple sharing domains may be undesired and may trigger a reconfiguration of sharing domains.

For illustration, the operation is described with regard to sharing domain $304_1$; however, the operation of the sharing domains $304_2$ and $304_3$ may be substantially similar to operation of the sharing domain $304_1$.

In operation, each of the communication devices 302a, 302f, and 302k may be operable to communicate its networking state information to the communication device 302e, the communication device 302e may be operable to generate corresponding aggregate networking state information and communicate the aggregate networking state information to the communication devices 302a, 302f, and 302k. The devices 302a, 302e, 302f, and 302k may then route and/or otherwise handle the traffic based on the aggregate networking state information.

In instances that the communication device 302e fails or otherwise cannot operate as the management device, the communication device 302k may take over management functions and the routing, switching, ridging, and/or processing of information may continue based on aggregate networking state information. In this manner, only updates and/or modifications made since the last time the device 302e output aggregate networking state information may be lost. Once the communication device 302k takes over management functions, the aggregate networking state information generated by the management device 302k may reflect changed network conditions resulting from the change in the management device.

Figure 3B:
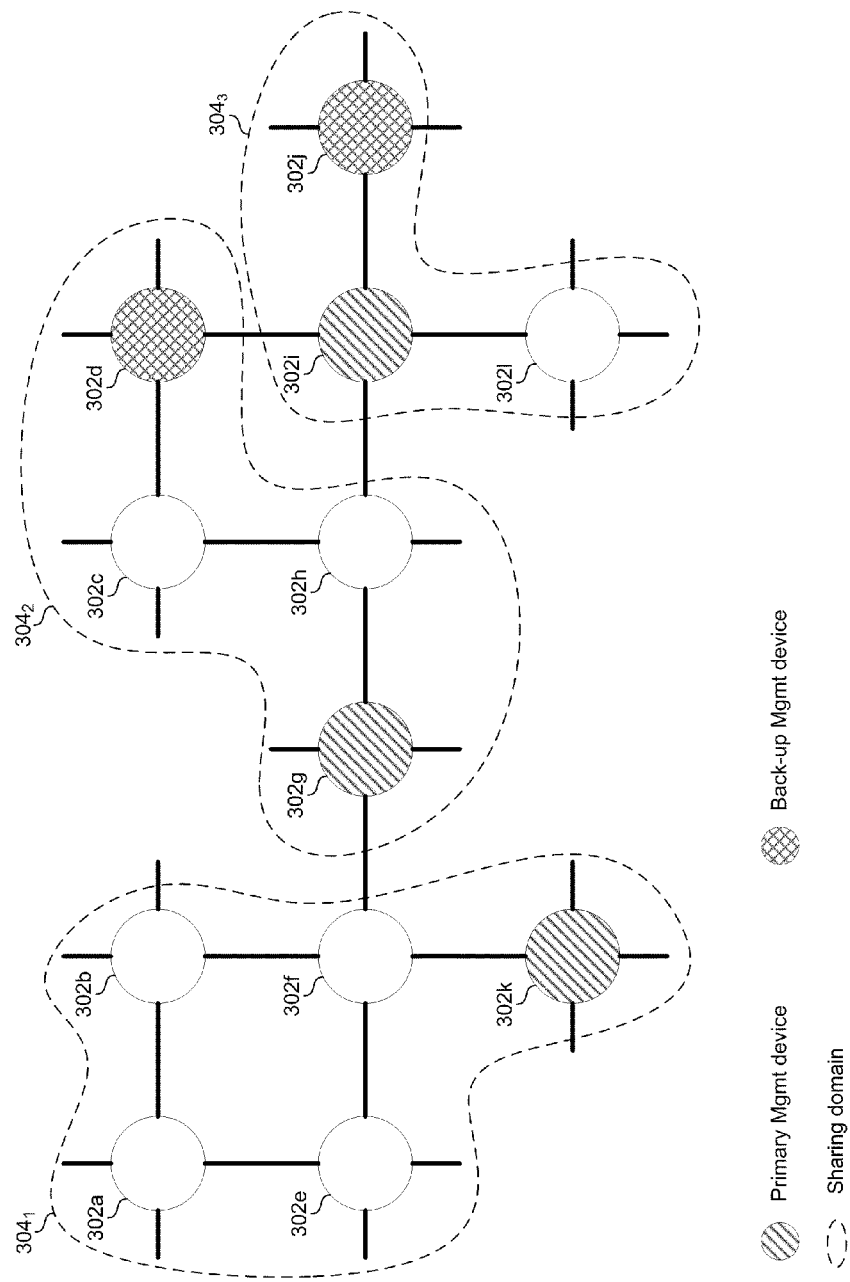
FIG. 3B depicts the network of FIG. 3A after reconfiguring of the sharing domains, in accordance with an embodiment of the invention.

FIG. 3B depicts the network of FIG. 3A after reconfiguring of the sharing domains, in accordance with an embodiment of the invention. Reconfiguration of the sharing domains $304_1$ and $304_2$ may occur automatically by, for example, the network management device or may be performed by a network administrator. A determination to reconfigure a sharing domain may be based, for example, on traffic patterns and/or failures in the network. Reconfiguration a sharing domain may comprise, for example, adding or removing communication devices from the sharing domain and/or selecting different management device(s) and/or the backup management devices for the sharing domain With regard to the sharing domain $304_1$, in FIG. 3B as compared to FIG. 3A, the communication device 302e is no longer operating as the management device and the communication device 302k has been reconfigured to operate as the management device of the sharing domain $304_1$. Additionally, the communication device 302b has been added to the sharing domain $304_1$. Accordingly, the communication devices 302a, 302b, 302e, and 302f may be operable to communicate networking state information to the communication device 302k and the communication device 302k may aggregate the networking state information and communicate the resulting aggregate networking state information to the communication devices 302a, 302b, 302e, and 302f.

With regard to sharing domain $304_2$, the communication devices 302b and 302f may no longer be part of the sharing domain $304_2$. Accordingly, portions of the aggregate networking state information stored in the communication devices 302c, 302d, 302g, 302h associated with the communication devices 302b and 302f may no longer be updated or may, in some instances, be deleted.

Figure 4:
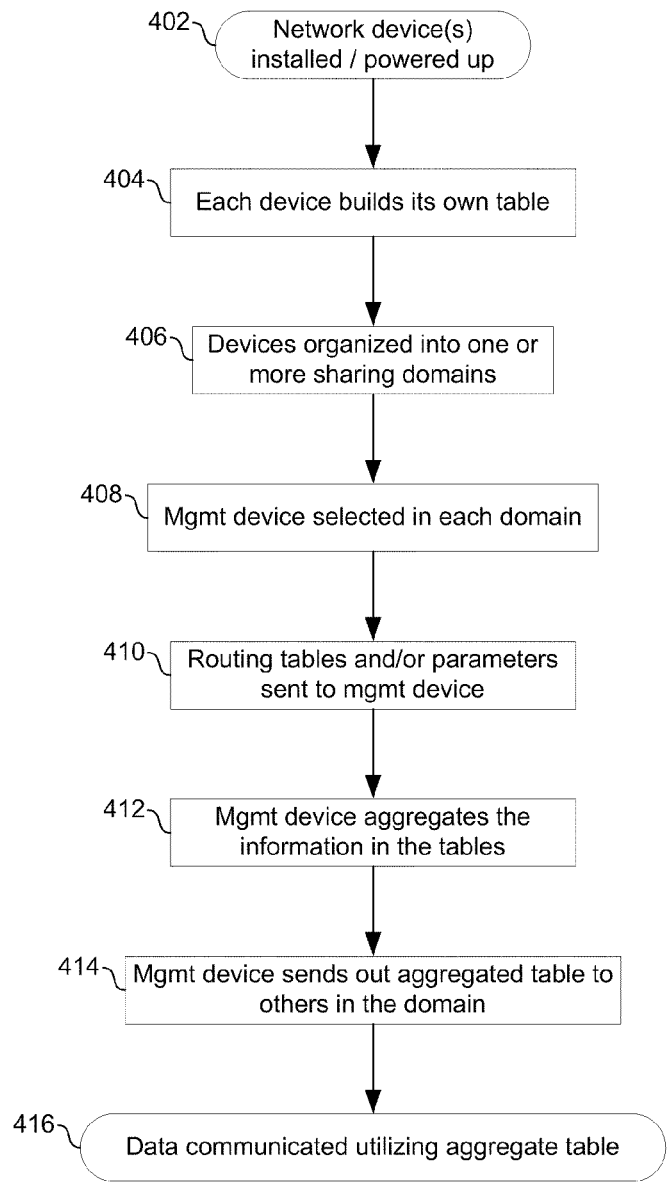
FIG. 4 is a flow chart illustrating exemplary steps for communicating data in a network utilizing aggregated networking state information, in accordance with an embodiment of the invention.

FIG. 4 is a flow chart illustrating exemplary steps for communicating data in a network utilizing aggregated networking state information, in accordance with an embodiment of the invention. Referring to FIG. 4, the exemplary steps may begin with step 402 when one or more communication devices in a network are powered up and/or otherwise initialized. Subsequent to step 402, the exemplary steps may advance to step 404.

In step 404, each of the devices 404 may build one or more routing, switching, and/or bridging tables and/or determine various parameter values and/or rules, where the parameters and/or rules may indicate how to handle traffic based on, for example, type of traffic, source and/or destination of the traffic, application generating the traffic, a quality of service required or to be provided to the traffic, and protocols associated with the traffic. Subsequent to step 404, the exemplary steps may advance to step 406.

In step 406, the network may be organized into one or more sharing domains. In this regard, one or more sharing domains may be established based on factors such as location of communication devices, capabilities of communication devices, and traffic patterns in the network. Subsequent to step 406, the exemplary steps may advance to step 408.

In step 408, one or more management devices may be selected in each of the sharing domains. Exemplary methods for selecting a management device may comprise, for example, selecting a device at random, selecting a device based on capabilities and/or configuration of the device, and/or selecting a device based on traffic patterns in the sharing domain. Exemplary capabilities and/or configuration may comprise available computing and/or processing resources, available storage capability, and/or accessibility. Subsequent to step 408, the exemplary steps may advance to step 410.

In step 410, non-management devices in a sharing domain may communicate their networking state information to the management device. The networking state information may be communicated, for example, simple network management protocol (SNMP) and/or encapsulated in Ethernet frames. In an exemplary embodiment of the invention, the networking state information may be communicated via one or more Ethernet frames having distinct Ethertype indicating the contents of the packet to be such networking state information. In various embodiments of the invention, the networking state information and/or parameters may be securely communicated utilizing protocols such as IPsec and/or MACsec. Subsequent to step 410, the exemplary steps may advance to step 412.

In step 412, the management device may process the tables and/or parameters received from the other devices in its sharing domain to generate aggregate networking state information. In various embodiments of the invention, the networking state information received from the other communication devices may be transcoded into a common format. In various embodiments of the invention, redundant networking state information may be kept out of, or deleted from, the aggregate networking state information. Subsequent to step 412, the exemplary steps may advance to step 414.

In step 414, the management device may send the aggregate networking state information to the other devices in its sharing domain. The networking state information may be communicated, for example, simple network management protocol (SNMP) and/or encapsulated in Ethernet frames. In an exemplary embodiment of the invention, the networking state information may be communicated via one or more Ethernet frames having a distinct Ethertype indicating that the contents of the packet comprises aggregate networking state information. In various embodiments of the invention, the aggregate networking state information may be securely communicated utilizing protocols such as IPsec and/or MACsec. Subsequent to step 414, the exemplary steps may advance to step 416.

In step 416, traffic may be communicated and/or otherwise processed by the devices in the sharing domain based on the aggregate networking state information. Updates may periodically be sent and/or received from the management device.

Thus, aspects of a method and system for network communications utilizing shared scalable resources are provided. In an exemplary embodiment of the invention, networking state information 'A' and 'C' for communication devices 102a, and 102c, respectively, may be communicated to a network management device 102b. The network management device 102b may be operable to generate aggregate networking state information 'D' based on the networking state information 'A' and 'C' and based on its own networking state information 'B'. The communication devices 102a and 102c may receive the aggregate networking state information 'D' from the network management device 102b. The communication devices 102a, 102b, and 102c may route, switch, bridge, or otherwise process packets based on the aggregate networking state information 'D'. The network device 102b may be dynamically selected to operate as the network management device. The network device 102b may be selected to operate as the network management device by a network administrator. Updates and/or changes to the networking state information 'A' and 'C' may be communicated to the network management device 102b. The plurality of communication devices 102a, 102b, and 102c may be associated with a sharing domain, such as the sharing domains 304 depicted in FIGS. 3A and 3B, and one or more of the communication devices 102a, 102b, and 102c and/or other communication devices may be dynamically added to and/or removed from the sharing domain.

The aggregate networking state information 'D' may also be communicated from the network management device 102b to a backup network management device. The aggregate networking state information 'D' may be communicated to the backup network management device periodically or aperiodically. The networking state information 'A' and 'C' may be communicated to a backup network management device upon detecting a failure of the network management device 102b. After a failure of the network management device 102b, the communication devices 102a and 102c may begin receiving aggregated networking state information from the backup management device. The networking state information may comprise, for example, routing, switching, and/or bridging tables. The networking state information may comprise, for example, one or more parameter values associated with one or more applications running on one or more of the communication devices 102. The networking state information may comprise, for example, one or more parameter values associated with one or more datastreams being communicated by one or more of the communication devices.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for network communications utilizing shared scalable resources.

Accordingly, the present invention may be realized in hardware, software, or a combination of hardware and software.

The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising
   at a respective communication device of a plurality of communication devices in a network,
      identifying applications of the respective communication device;
      identifying protocols used by the respective communication device for processing packets received at the respective communication device;
      determining parameter values associated with the identified applications and for use by the respective communication device for determining how to process packets received at the respective communication device;
      generating respective networking state information for the respective communication device, the respective networking state information including the determined parameter values and further defining data communication paths available to use for transmitting data from the respective communication device;
      communicating the respective networking state information from the respective communication device to a network management device;
      receiving from the network management device aggregated networking state information, the aggregated networking state information including the respective networking state information combined with respective networking state information for respective other communication devices of the plurality of communication devices in the network; and
      subsequently, processing packets received at the respective communication device using the aggregated networking state information.

2. The method of claim 1 wherein processing packets using the aggregated networking state information comprises:
   selecting a route from the respective communication device to a packet destination using respective networking state information of another respective communication device received at the respective communication device with the aggregated networking state information.

3. The method of claim 1 wherein generating respective networking state information comprises generating a routing table defining selected ports of the respective communication device to use for transmitting data to a selected packet destination.

4. The method of claim 1 wherein receiving the aggregated networking state information comprises receiving network state information that includes all respective networking state information for all respective communication devices, excluding any redundant networking state information.

5. The method of claim 4 further comprising:
   storing the aggregated networking state information; and
   overwriting previously existing networking state information.

6. The method of claim 4 further comprising:
   storing the aggregated networking state information; and
   appending the aggregated networking state information to previously existing networking state information at the respective communication device.

7. The method of claim 1 further comprising:
   defining a sharing domain including a sharing domain, the sharing domain defined to include a defined subset of communication devices of the plurality of communication devices in the network, including the respective communication device and the network management device;
   and wherein receiving the aggregated networking state information comprises receiving networking state information that is an aggregation of networking state information of only the communication devices of the defined subset of communication devices of the sharing domain.

8. The method of claim 7 further comprising:
   detecting a failure of a communication device in the network;
   in response to the detected failure, determining to reconfigure the sharing domain; and
   reconfiguring the sharing domain to accommodate the failed communication device.

9. The method of claim 8 wherein reconfiguring the sharing domain comprises:
   designating the respective communication device as a backup management device for the sharing domain;
   receiving at the respective communication device from the network management device the aggregated networking state information upon detecting a failure of the network management device; and
   subsequently, operating the respective communication device as the network management device.

10. The method of claim 9 wherein operating the respective communication device as the network management device comprises:
    receiving from respective communication devices of the subset of communication devices of the sharing domain updated respective networking state information;
    aggregating the updated respective networking state information to form updated aggregated networking state information; and
    communicating the updated aggregated networking state information to the respective communication devices of the subset of communication devices of the sharing domain for use in processing packets received at the respective communication devices of the subset of communication devices of the sharing domain.

11. The method of claim 8 wherein reconfiguring the sharing domain comprises:
adding or removing a communication device from the sharing domain.

12. A communication device comprising:
communication ports configured to communicate data with other communication devices in a network including a plurality of communication devices;
a memory configured to store data; and
a processor in data communication with the communication ports and the memory, the processor configured to cause the communication device to
determine parameter values associated with applications which are run on the communication device and determine parameter values associated with the identified applications useable by the communication device to determine how to process packets received at the communication device,
generate networking state information for the communication device, the networking state information including the parameter values and port definition information defining which communication port of the communication ports to use for transmitting data from the communication device,
transmit the networking state information to a network management device in the network,
receive from the network management device aggregated networking state information which includes respective networking state information for other respective communication devices of the plurality of communication devices, the aggregated networking state information including port definition information for the other respective communication devices,
store the received aggregated networking state information in the memory,
subsequently, receive a packet at the communication device, and
cause the communication ports to route the packet to another communication device of the plurality of communication devices using the port definition information for another communication device received in the aggregated networking state information.

13. The communication device of claim 12 wherein the processor is further configured to, from time to time, generate updated networking state information for the communication device and communicate the updated networking state information to the network management device.

14. A method comprising:
receiving, at a communication device in a network, respective networking state information from a plurality of respective communication devices in the network, the respective networking state information defining for each respective communication device how to process a packet received at the respective communication device to communicate the packet toward a packet destination, the respective networking state information including parameter values associated with applications running on the respective communication devices;
when the respective networking state information has been received from substantially all respective communication devices, aggregating the respective networking state information to form aggregated networking state information; and
communicating the aggregated networking state information to each respective communication device of the plurality of communication devices, the aggregated networking state information for use by the respective communication devices for communicating a packet subsequently received at the respective communication device toward the packet destination.

15. The method of claim 14 wherein aggregating the respective networking state information comprises combining all respective networking state information received from the respective communication devices to form the aggregated networking state information.

16. The method of claim 15 further comprising removing from the aggregated networking state information redundant networking state information received from two or more respective communication device of the plurality of communication devices.

17. The method of claim 14 further comprising:
receiving updated networking state information from one or more respective communication devices;
combining the received updated networking state information with the aggregated networking state information to form updated aggregated networking state information; and
communicating the updated aggregated networking state information to each respective communication device of the plurality of communication devices.

18. The method of claim 14 further comprising:
defining a sharing domain including a subset of the plurality of communication devices;
aggregating only the respective networking state information received from communication devices of the subset in the sharing domain; and
communicating the aggregated networking state information only to each communication device of the subset in the sharing domain.

19. The method of claim 14 further comprising:
designating the communication device as a management device for the plurality of respective communication devices and the communication device.

20. The method of claim 19 wherein designating the communication device as a management device comprising designating the communication device as a management device based on capabilities of the communication device or based on communication traffic patterns.

* * * * *

UNITED STATES PATENT AND TRADEMARK OFFICE
CERTIFICATE OF CORRECTION

Page 1 of 1

PATENT NO. : 8,817,638 B2
APPLICATION NO. : 12/616603
DATED : August 26, 2014
INVENTOR(S) : Wael William Diab et al.

It is certified that error appears in the above-identified patent and that said Letters Patent is hereby corrected as shown below:

On the Title Page

Left column, item (75), replace "Jayhan Karaoguz," with --Jeyhan Karaoguz,--.

Signed and Sealed this
Seventeenth Day of February, 2015

Michelle K. Lee
*Deputy Director of the United States Patent and Trademark Office*